Patented Feb. 21, 1928.

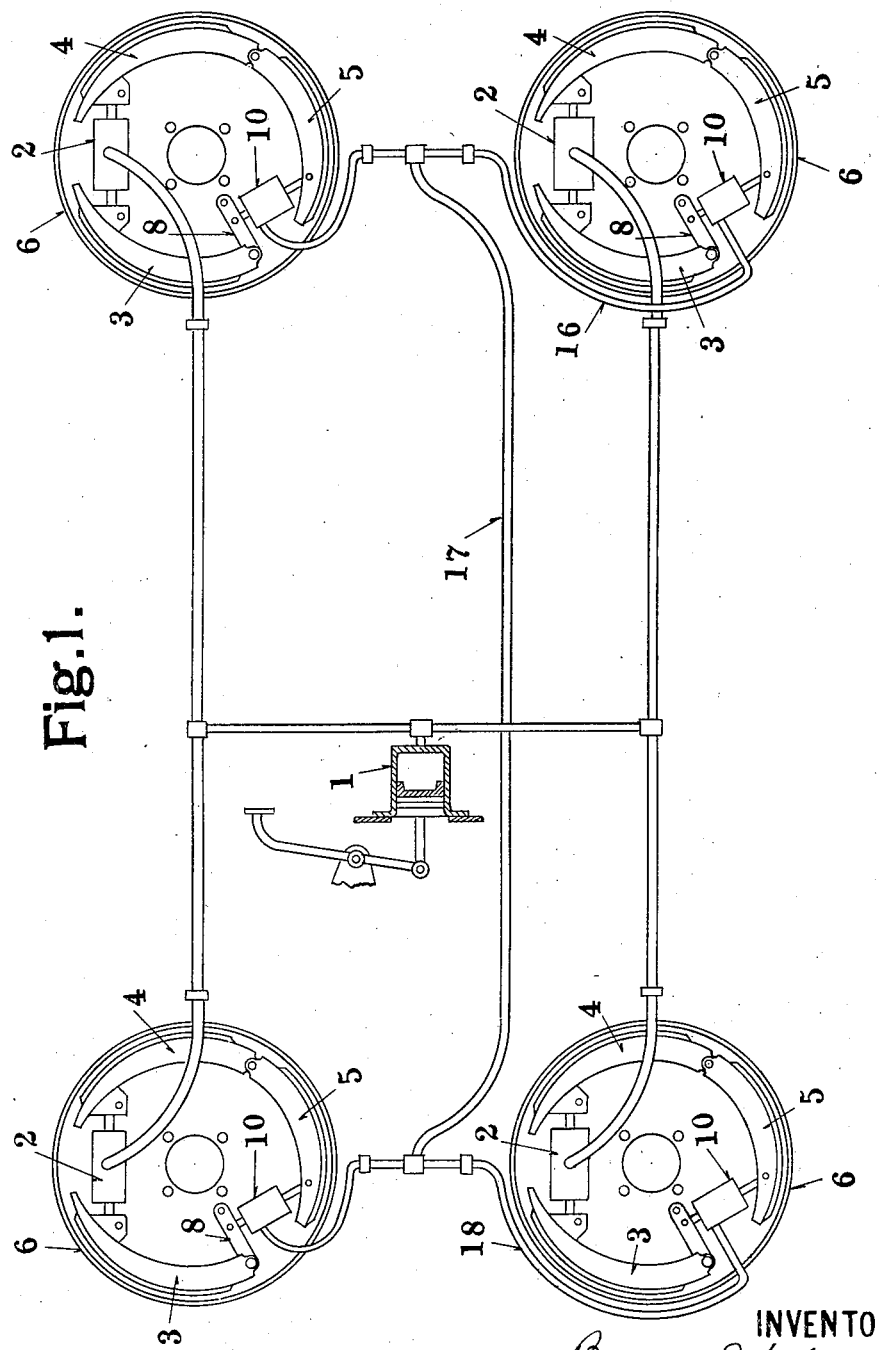

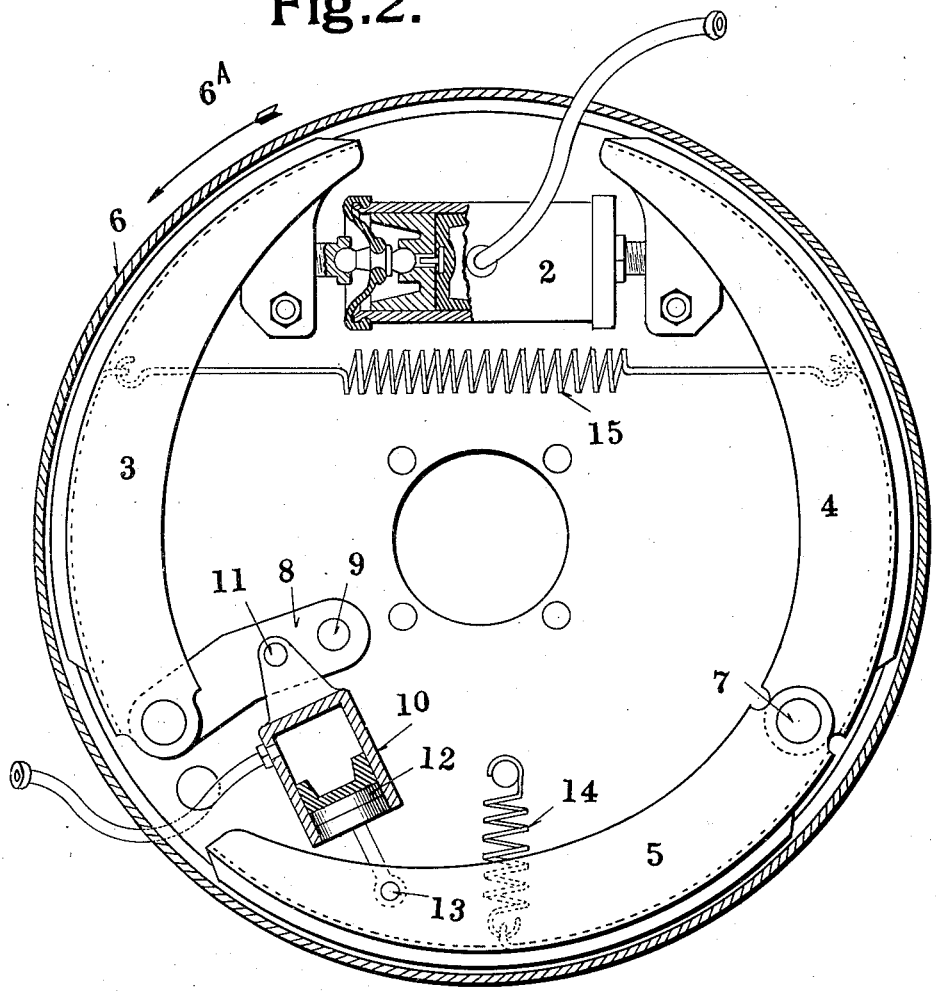

1,659,811

UNITED STATES PATENT OFFICE.

BURNS DICK, OF ST. LOUIS, MISSOURI, ASSIGNOR TO WAGNER ELECTRIC CORPORATION, OF ST. LOUIS, MISSOURI, A CORPORATION OF DELAWARE.

BRAKING APPARATUS.

Application filed March 19, 1926. Serial No. 95,819.

My invention pertains to braking apparatus of the "regenerative" type in which a primary shoe is so mounted as to be capable of limited bodily movement in the direction in which the brake drum tends to impel it when it is applied thereto, and is so connected to a secondary shoe as to apply a braking pressure to it varying with the friction between the primary shoe and the brake drum and the leverage of the connection between the shoes.

This type of apparatus is employed for the purpose of increasing the total braking effect without increasing the pedal pressure applied to actuate the primary shoe, and therefore makes possible manual brake control of large vehicles without expenditure of greater effort on the part of the operator than required in smaller vehicles using the ordinary types of brakes in which the braking effect depends entirely upon the pedal pressure.

In the regenerative type of brake referred to the pressure on the secondary shoe depends upon the frictional action between the brake drum and the primary shoe, and even though the pressure on the primary shoes on two or more wheels be equalized and the lining of these shoes of the same material and designed to have equal areas of contact with their brake drums, the resulting frictional drags on the shoes may not be the same, due to the varying conditions of the brake linings or the presence of dirt, oil or grease between the frictional surfaces, with the result that the pressures on the secondary shoes of the wheels may not be equal and the total braking effect on the wheels therefore not equalized. My invention overcomes this difficulty and provides means whereby the pressures applied to the secondary brake shoes of two or more wheels of a vehicle will be exactly the same. The invention is applicable to braking systems in which the primary shoes are actuated either mechanically or hydraulically.

In the accompanying drawings Figure 1 diagrammatically indicates an application of my invention to equalize the secondary braking pressure on the four wheels of a vehicle; and Figure 2 is an enlarged view of the braking apparatus on a single wheel, the apparatus being the same in structure and dimensions on all of the wheels.

In Figure 1 I have shown a well known form of hydraulic means for actuating the primary brake shoes, the liquid pressure being applied by means of the pedal operated piston in the master cylinder 1 to the movable pistons in the wheel cylinders 2 through the piping and flexible hose connections shown. In this apparatus the pressure applied to the floating primary shoes on each of the four wheels is equalized.

Referring now more particularly to Figure 2, the floating primary shoe 3, fixed primary shoe 4, and the fixed secondary shoe 5 cooperate with the brake drum 6, shoes 4 and 5 being mounted on stationary pivot 7. The direction of motion of the drum for forward motion of the vehicle is indicated by the arrow 6ᴬ. One end of the floating primary shoe 3 is pivotally connected with the free end of link 8, the other end of said link being mounted on fixed pivot 9. A cylinder 10 is pivotally connected to link 8 at 11 and the piston 12 operating in this cylinder is pivotally connected at 13 to the secondary shoe 5. Spring 14 connected to the shoe 5, and spring 15 connecting the free ends of the shoes 3 and 4 tend to hold the brake shoes out of contact with the brake drum. The cylinder 10 communicates with the corresponding cylinder on the opposite wheel of the vehicle through hose and pipe connections 16 or 18, as shown, and the cylinders and piping are filled with a suitable liquid. It results from this arrangement that even though the frictional dragging forces applied by the drums to the primary shoes 3 of the two wheels is unequal, the forces applied to the secondary shoes 5 of these wheels will be equal since the pressure applied to each of the pistons 12 is a liquid pressure which will necessarily be the same in both cylinders. The range of possible motion of cylinders in the cylinders is such that even if one primary shoe applied no pressure at all to its cylinder, the pressure applied by the other primary shoe would be communicated equally to the secondary shoes on both wheels.

Not only does my invention permit the equalization of the pressures on the secondary shoes of either or both pairs of wheels but, as shown in Figure 1, by interconnecting the equalizing connections by pipe 17 the pressures on all four of the secondary shoes will be equalized.

Having fully described my invention, what I claim as new and desire to secure by Letters Patent of the United States is:

1. The combination comprising two or more moving parts, braking mechanism for each part, each mechanism comprising a secondary brake shoe and a primary brake shoe connected for applying pressure to the secondary shoe, said connections comprising a fluid medium through which the pressure is applied, and means whereby the fluid pressures in said connections are equalized.

2. The combination comprising two or more moving parts, braking mechanism for each part, each braking mechanism comprising a primary shoe and a secondary shoe, the primary shoe being mounted to permit it to have limited bodily movement, a piston chamber connected to one of the shoes and a piston operating in said chamber and connected to the other shoe, and means establishing communication between the piston chambers.

3. Braking mechanism comprising a primary shoe and a secondary shoe, and connections whereby the braking drag on the primary shoe may apply braking pressure to the secondary shoe, said connections comprising means forming an expansible fluid chamber.

4. Braking mechanism comprising a primary shoe and a secondary shoe, and connections whereby the braking drag on the primary shoe may apply braking pressure to the secondary shoe, said connections comprising a piston chamber mechanically connected with one of said shoes, and a piston operating in said chamber and mechanically connected with the other shoe.

5. The combination with a brake drum, of a primary and a secondary shoe operating therewith, said primary shoe being mounted to permit it to move with the drum through a small arc, and connections whereby such movement applies braking pressure to the secondary shoe, said connections comprising a piston chamber mechanically connected to one of said shoes and a piston operating in said chamber and mechanically connected to the other shoe, and means for holding the primary shoe in frictional engagement with the brake drum.

6. Braking apparatus for two or more moving parts, comprising a brake element for each part for restraining its movement, a floating brake element for restraining the movement of one of said parts, and hydraulic means whereby the braking drag on said floating element may apply pressure to all of the first mentioned brake elements.

In testimony whereof, I hereunto affix my signature, this 15th day of March, 1926.

BURNS DICK.